(12) United States Patent
Braaten (10) Patent No.: US 10,344,546 B2
(45) Date of Patent: Jul. 9, 2019

(54) METHOD AND VALVE ASSEMBLY FOR FLUSHING OF DEBRIS

(71) Applicant: FMC Kongsberg Subsea AS, Kongsberg (NO)

(72) Inventor: Knut Roar Braaten, Stokke (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 15/555,550

(22) PCT Filed: Mar. 3, 2016

(86) PCT No.: PCT/EP2016/054578
§ 371 (c)(1),
(2) Date: Sep. 5, 2017

(87) PCT Pub. No.: WO2016/139315
PCT Pub. Date: Sep. 9, 2016

(65) Prior Publication Data
US 2018/0051529 A1    Feb. 22, 2018

(30) Foreign Application Priority Data

Mar. 4, 2015  (NO) .................................. 20150293

(51) Int. Cl.
*E21B 21/10* (2006.01)
*F16K 17/06* (2006.01)
(Continued)

(52) U.S. Cl.
CPC ............ *E21B 21/103* (2013.01); *E21B 21/10* (2013.01); *E21B 34/00* (2013.01); *E21B 34/14* (2013.01);
(Continued)

(58) Field of Classification Search
CPC .. F16K 17/30; F16K 17/065; Y10T 137/7838; Y10T 137/7847;
(Continued)

(56) References Cited

U.S. PATENT DOCUMENTS 3,703,913 A    11/1972 Carsten
5,031,661 A *  7/1991 Feuz ....................... E03C 1/106
                                                   137/613

(Continued)

FOREIGN PATENT DOCUMENTS

EP    0 769 644 A1    4/1997
EP    2 636 840 A1    9/2013
WO    WO 90/12231 A1   10/1990

*Primary Examiner* — Kevin L Lee (57) ABSTRACT

The invention concerns a method for flushing of debris from a valve assembly arranged in a fluid line. The valve assembly comprises at least two flow regulating units arranged in series between an inlet and an outlet of the valve assembly. The inlet pressure is larger than the outlet pressure, and each flow regulating unit has a spring element and an opening is provided for each flow regulating unit which initially is set as a minimum opening allowing fluid to pass from one side of the each of the flow regulation unit to the other side of the flow regulation unit. The spring element regulates the opening in response to the pressure difference over the flow regulating unit. The method comprises the following steps in the case when at least one of the openings clogs: —equalizing the pressure over the other flow regulating unit(s) downstream and upstream to the clogged opening thereby—providing a pressure difference across the flow regulating unit where clogging occurs, which pressure difference exceeds the spring force and increases the opening for this flow regulating unit for flushing the debris. The invention also concerns a valve assembly, a use of the valve assembly and a fluid injection valve assembly.

19 Claims, 5 Drawing Sheets

(51) Int. Cl.
  *E21B 34/00*   (2006.01)
  *E21B 43/16*   (2006.01)
  *F16K 17/28*   (2006.01)
  *E21B 34/14*   (2006.01)
  *F16K 17/30*   (2006.01)

(52) U.S. Cl.
  CPC .............. *E21B 43/16* (2013.01); *F16K 17/06* (2013.01); *F16K 17/065* (2013.01); *F16K 17/28* (2013.01); *F16K 17/30* (2013.01); *Y10T 137/87917* (2015.04)

(58) Field of Classification Search
  CPC ....... Y10T 137/7848; Y10T 137/87917; E21B 21/103; E21B 34/08
  USPC ........................................................ 137/240
  See application file for complete search history.

(56) References Cited

U.S. PATENT DOCUMENTS

| | | |
|---|---|---|
| 7,591,282 B1 | 9/2009 | Achterman |
| 2013/0056216 A1 | 3/2013 | He |
| 2013/0228526 A1 | 9/2013 | McAfee et al. |

\* cited by examiner

METHOD AND VALVE ASSEMBLY FOR FLUSHING OF DEBRIS

FIELD OF THE INVENTION

The present invention relates to a method, and arrangement for flushing/cleaning of debris from a valve assembly, for instance a valve assembly, as well as a use for the arrangement and a fluid injection valve assembly. The invention may find its particular application where the valve assembly is used for injecting chemicals into a well.

As the working principles of the present invention enable a versatile use, the invention may also be applicable to applications other than injection of chemicals into the well. An application where the access to a potentially clogged valve assembly is limited is recognized as a possible field of use for the invention.

BACKGROUND OF THE INVENTION

Chemical injection valves are core components in the subsea valve trees, but are also used for topside installations.

Chemical injection valves are used to inject a continuous flow of chemicals into a well to prevent clogging of the well and the flow line. Chemical injection valves are throttle valves that throttle the flow from a high pressure chemical supply line into an oil/gas flow line/well with less pressure. The chemical injection valve controls the magnitude of the chemical flow.

With all chemical injection valves and other small sized valves that have a restricted fluid passage there is a risk of debris getting caught in the fluid passage and clogging the fluid passage.

In accordance with prior art, an internal control system is arranged for flushing the valve if clogging is registered. Such control systems are vulnerable to clogging themselves because they usually involve small apertures that measure the flow by differential pressure. The control system that measures the flow operates either a piston or a motor that opens the throttling orifice if flushing is needed.

This prior art flushing system is relatively complex and the use of such a flushing system adds a vulnerability to the working of the valve arrangement, as the flushing of the clogged valves depend on the proper working of the valve arrangement. The use of the prior art flushing system causes a reduced flow rate due to the size of the measurement apparatus for monitoring the flow.

The invention proposes an alternative solution to the prior art control system by basing the inventive idea on a different set of principles to flush a clogged valve. As a consequence, the simplified inventive solution for flushing of the clogged valve assembly improves the reliability of the flow of fluid as it does not involve complex sensors, control systems and electric actuating means to flush the valve. A reliable flow of injection chemicals is a key factor for sustainable production from oil and gas wells and a sought after property for a chemical injection valve. Further, by employing the invention it is possible to obtain a larger flow range since the small measurement apertures used to monitor flow and clogging of the main orifice are not needed. The possibility of a larger flow range means that the variety of valve sizes can be reduced. This will simplify documentation and administration, give less room for delivery errors and make it more cost efficient to hold valves in store since one part number covers many needs.

SUMMARY OF THE INVENTION

The independent claims define a method and arrangement for flushing of debris from a valve assembly as well as the use of this arrangement and a fluid injection valve assembly. The dependent claims define advantageous embodiments of the invention as defined in the independent claims.

The invention concerns a method and arrangement which is self contained and provides a simplified self cleaning of a clogged valve assembly that essentially eliminates the risk of permanent clogging of the valve assembly. The working principles of the invention may be characterized as autonomous. In principle there is no need for an external control system which monitors and opens the fluid passage through the valve by using an additional motor or other additional equipment necessary to control the size of the fluid passage. But, it is possible to provide the invention with a control system arranged to overrun the working principles of the invention in certain modes of operation.

The invention is based on simple mechanical working principles utilizing a simple physical phenomena that ensures a reliable and rapid flushing of debris when clogging occurs in the valve assembly.

The invention concerns a method for flushing of debris from a valve assembly arranged in a flow line. The method may be an autonomous method. The valve assembly comprises at least two flow regulating units arranged in series between an inlet and an outlet of the valve assembly. Each flow regulating unit has a spring element. The inlet pressure of the valve assembly is larger than the outlet pressure of the valve assembly. An opening is provided for each flow regulating unit. The opening is initially set at a minimum opening allowing fluid to pass from one side of the flow regulating unit to the other side of the flow regulating unit. The spring element regulates the opening in response to the pressure difference over the flow regulating unit.

The method comprises the following steps in the case where at least one of the openings of the flow regulating unit becomes clogged. The opening may then be in a minimum opening position or regulated depending on flow conditions, such as an operational opening position during normal flow conditions. The following steps are then carried out:

equalizing the pressure over the other flow regulating unit(s) downstream and upstream to the flow regulating unit with the clogged opening and thereby providing a pressure difference across the flow regulating unit(s) where clogging occurs, which pressure difference exceeds the spring force and increases the opening for this flow regulating unit for flushing the debris.

The method may be used in a fluid line transporting a chemical fluid to be injected into a well area wherein the flushing of debris from the valve assembly is conducted by the chemical fluid. The flushing of debris from the valve assembly may then be carried out by a chemical fluid which is to be injected into the well area.

Further, the invention concerns a valve assembly which may be used in a chemical injection fluid line. The valve assembly may be an autonomous valve assembly. The valve assembly comprises at least two flow regulating units arranged in series between an inlet and an outlet of the valve assembly. The inlet pressure is larger than the outlet pressure. The valve assembly is provided with an opening for each flow regulating unit, which opening is initially set at a minimum opening for fluid to pass from one side of the flow regulating unit to the other side of the flow regulating unit. Each flow regulating unit is provided with a spring element for regulating the opening in response to the pressure difference over the flow regulating unit.

The valve assembly is configured to flush the debris in the case where one of the openings for the flow regulating units becomes clogged.

The opening may then be in a minimum opening position or regulated depending on flow conditions, such as an operational opening position during normal flow conditions.

When one of the openings for the flow regulating units clogs, the said minimum opening for at least one of other the flow regulating units upstream or downstream to the clogged opening provides for equalization of the pressure over the least one of other the flow regulating units (that is, the flow regulating unit(s) where the opening(s) is not clogged). When clogging occurs the equalization of the pressure results in an increased pressure difference over the flow regulating unit with the clogged opening, which pressure difference exceeds the spring force, and the opening is increased for flushing of the clog, for instance debris, from the opening.

The valve arrangement in accordance with the invention comprises multiple, for instance two, three, four or five subsequent flow regulating units, each of which is provided with a minimum opening allowing flow to pass each of the flow regulating units.

The inlet pressure of the valve arrangement may correspond to the pump pressure, and the outlet pressure may correspond to the well pressure. The inlet pressure and the outlet pressure may be set to pressures different from the pump pressure and the well pressure, and the valve arrangement may also be employed at a location where other pressure sources are more readily available.

It should be noted that the inlet pressure, such as the pumping pressure, and the outlet pressure, such as the reservoir pressure, are to be regarded as constants regardless of the flow through the valve. The pump capacity and the flow capacity of the pipes are so large that the flow through the valve does not affect the inlet pressure or the outlet pressure.

As explained above, each flow regulating unit is provided with a spring element for regulating the opening for the flow regulating unit in response to the pressure difference over the flow regulating unit. The spring element regulates the opening of the flow regulating unit during normal flow conditions and also regulates at which pressure difference the flow regulating unit opens for flushing. The resistance force of the spring element may be the same or different for all flow regulating units in the valve assembly. The spring element may be a stiff spring or a pre-compressed spring.

As the skilled person will realize, a preloading arrangement capable of providing resistance until a certain pressure level is obtained, thereafter complying to move a body of the flow regulating unit away from its initial position, may be used as an alternative to the spring.

The minimum opening for each of the flow regulating units provides for a continuous flow of fluid through the (injection) valve arrangement where the flow regulating units are arranged in a serial relationship so that the fluid flows through all the flow regulating units before leaving the outlet. The opening, such as the minimum opening for the flow regulating units, may be regulated to determine the fluid flow and the amount of fluid to be introduced, for instance into the well or into another utilization area designated for the fluid flow.

The minimum opening for the flow regulating unit may be configured in various ways to prevent the body of the flow regulating unit from being moved to a position at which the minimum opening is closed. In one embodiment the body of the flow regulating unit may be positioned at a distance away from a seat or other components within the valve arrangement to provide the minimum opening. Stop means may be provided in order to position the body of the flow regulating unit to allow for a minimum opening for the flow regulating unit. The stop means may comprise adjustable means, for instance a screw mechanism, for regulating the minimum opening. Alternatively, the stop means may be configured as a more permanent structure which provides a simple end stop position for the body of the flow regulating unit to thereby provide the minimum opening, for instance between the body of the flow regulating unit and the seat.

In another embodiment the minimum opening may be provided by a recess or a through opening in the body of the at least one of the flow regulating unit or in a seat for the body of the flow regulating unit.

The minimum opening may also be provided by a flow acting on the body of the flow regulating unit which places the body of the flow regulating unit in a position to allow for the appearance of the minimum opening.

In another embodiment the spring element may be arranged to position the body of the flow regulating unit to provide the minimum opening. The minimum opening may be regulated by adjusting the spring element.

The minimum opening may also be arranged by diverting the fluid flow from the first side of the body of the flow regulating unit through a fluid passage separated from the body of the flow regulating unit and returning the fluid flow at the other side of the body of the flow regulating unit.

The fluid experiences a pressure drop when passing each of the flow regulating units, and the flow regulating units thus provide a stepwise reduction of pressure from the inlet to the outlet of the valve arrangement. The value of the pressure difference provided over each of the flow regulating units is determined by the difference between the inlet pressure and the outlet pressure and the number of flow regulating units included in the (injection) valve arrangement. This means that including a small number of flow regulating units in the valve arrangement, for instance two flow regulating units, provides a larger pressure difference over each flow regulating unit than including a larger number of flow regulating units, for instance five, in the (injection) valve arrangement.

During the normal working mode of operation, the fluid flows through the minimum openings of the flow regulating units from the inlet to the outlet of the (injection) valve arrangement. The pressure difference between the inlet pressure and the outlet pressure is distributed as pressure drops incurred by the fluid when passing through the flow regulating units in the (injection) valve arrangement. During the normal working mode of operation, the pressure difference over each of the flow regulating units may equal a portion of the pressure difference between the inlet and outlet pressure of the valve assembly, which may be distributed equally or unequally between the flow regulating units.

When clogging of one of the openings of the flow regulating units occurs, a portion or essentially all of the pressure difference between the inlet and outlet pressure of the valve assembly is utilized to increase the opening for flushing by equalizing the pressure over the other flow regulating unit(s) downstream and upstream of the flow regulating unit with the clogged opening.

When the opening of one flow regulating(s) unit clogs, this may cause the opening(s) for the other flow regulating units to present minimum openings, thereby equalizing the pressure over the other flow regulating unit(s).

The equalizing of pressure over the flow regulating unit(s) with non-clogged openings downstream and upstream occurs through the minimum openings of these flow regulating unit(s).

In the case when clogging occurs, such as when debris is stuck in an opening of one of the flow regulating units, or if the fluid flow through one of the flow regulating units is otherwise obstructed, a reduced flow of fluid, or no fluid flow at all, will pass through the clogged opening. All pressure drops caused by the flow of fluid through the clogged minimum opening will cease to exist. The lack of fluid flow causes the pressure upstream of the flow regulating unit with the clogged opening to increase through the equalizing of pressure through the minimum opening of the flow regulating unit(s) where clogging does not occur, and the pressure upstream of the flow regulating unit with the clogged opening will then equal the inlet pressure or a portion of the inlet pressure.

The pressure downstream the flow regulating unit with the clogged opening will decrease through the equalizing of pressure through the minimum opening for the flow regulating unit(s) where clogging does not occur, and will then equal the outlet pressure or a portion of the outlet pressure due to lack of fluid flow. Hence the pressure over the flow regulating unit with the clogged opening will increase to a portion of or essentially all of the pressure difference between the inlet and outlet pressure of the valve assembly. If there is no flow regulating unit(s) upstream of the flow regulating unit with the clogged opening, the equalizing of pressure through the minimum opening of flow regulating unit(s) with no clogging will occur downstream only. In this case the inlet pressure or a portion of the inlet pressure works directly on the flow regulating unit with the clogged opening at its upstream side. If there is no flow regulating unit(s) downstream of the flow regulating unit with the clogged opening, the equalizing of pressure through the minimum opening of the non-clogged flow regulating unit(s) with no clogging will occur upstream only. In that case the outlet pressure or a portion of the outlet pressure works directly on the flow regulating unit with the clogged opening at its downstream side.

As each of the flow regulating units is configured so that the force from the pressure difference is counterbalanced by a spring element, the flow regulating mechanism will open up and flush when the pressure difference increases over a certain preset value exceeding the counterbalancing spring force. The clogged opening of the flow regulating unit will then increase and allow for flushing of the debris from the opening of flow regulating unit.

If the inlet pressure corresponds to the pump pressure and the outlet pressure corresponds to the well pressure, the pressure difference working on flow regulating unit with the clogged opening for the flushing action will then be provided by the total pressure difference between the pump pressure and the well pressure or a portion of this pressure difference.

The size of the pressure difference necessary for flushing a clogged opening may vary in accordance with the number of flow regulating units included in the valve arrangement and the pressure difference over the flow regulating units during normal flow, but it will also vary in accordance with resistance to movement of the flow regulating unit, such as friction forces in the spring element. In some circumstances the friction in the spring element may be low and the need for available pressure to overcome the friction and compress the spring element will be lower than the available pressure difference. In this case only a portion of the pressure difference is necessary to move a flow regulating unit with a clogged opening. In other circumstances the friction forces are larger and a larger pressure difference will ensure that the friction forces are overcome and the force of the spring element is exceeded.

If the number of flow regulating units included in the valve arrangement is large, for instance five flow regulating units, each of the flow regulating units provides a smaller pressure difference than if the number of flow regulating units is smaller, for instance two flow regulating units. The resisting pressure provided by the spring element or other preloading means of each of the flow regulating units is set depending on the pressure difference over the specific flow regulating unit. When an opening of a flow regulating unit in a valve arrangement having a larger number of flow regulating units is clogged, the equalization of pressure over the flow regulating unit(s) with non-clogged opening(s) produces a larger change in pressure difference over the flow regulating unit with the clogged opening(s) than if the number of flow regulating units is smaller. Consequently, the pressure difference then provided over the flow regulating unit with the clogged opening will more easily exceed its resisting pressure (in some cases the pressure difference will largely exceed its resisting pressure), and produce an opening which is comparatively larger than the opening produced in a small-numbered valve arrangement. A large change in pressure difference over the flow regulating unit with the clogged opening will also make it easier to overcome possible friction in the spring mechanism, resulting in a lower probability that the opening action will seize up due to friction.

All flow regulating units within the same valve arrangement may be configured to be equal and the spring tension may be set equal. The minimum opening that provides the flow for normal working conditions may then be set equal. Alternatively, the flow regulating units may be provided with individual characteristics, individual spring tensions and individual minimum openings.

The invention also concerns the use of the valve assembly in a chemical injection fluid line.

The invention also concerns a fluid injection valve assembly for accurate regulation of fluid injection into a well. In this instance the fluid injection valve assembly comprises the above valve arrangement and a valve unit for opening and closing well access through the fluid line.

The flow regulating units to be included in this fluid injection valve assembly may each have a spring element which is configured to be adjustable for controlling the opening of the flow regulating unit and thereby the amount of injection fluid which enters the well.

Also, the inventive solution reduces the risk of cavitation and erosion inside the valve. Serious cavitation and erosion will degrade the integrity of a valve over time and could lead to a fatal leak of the internal flow to the environment. The fluids passing through the valve are quite often toxic or environmentally unfriendly. It is desirable to provide a valve arrangement so that the unwanted risk of cavitation and erosion is vastly reduced.

BRIEF DESCRIPTION OF THE DRAWINGS

In the following, embodiments of the invention will be described in detail with reference to the attached drawings, where.

DETAILED DESCRIPTION

Figure 1:
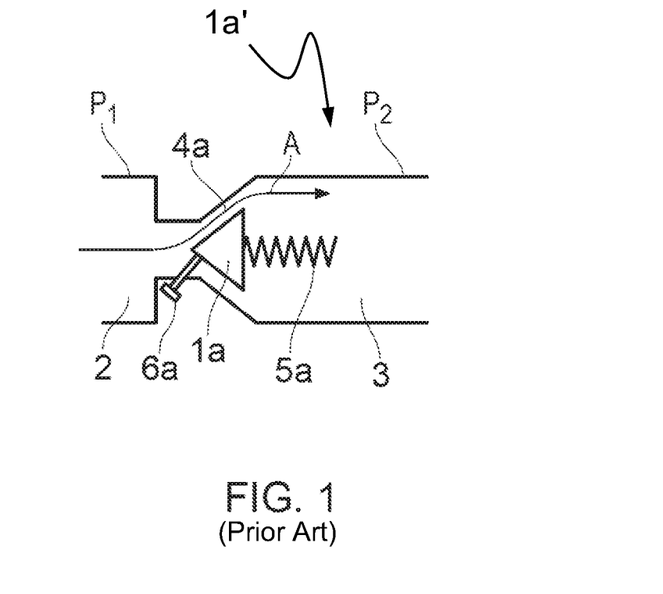
FIG. 1 shows a principle sketch of a prior art flow regulating unit.

A prior art flow regulating unit is shown in FIG. 1. The flow regulating unit 1a' has an inlet 2, here shown as an inlet channel, with an inlet pressure P1 and an outlet 3, here show as an outlet channel, with an outlet pressure P2. The flow regulating unit 1a' is arranged with a body 1a defining an opening 4a for regulating a flow A into the outlet 3 (which may be connected to a well or a well area connected to the well). The inlet pressure is larger than the outlet pressure, thus providing a pressure drop over the flow regulating unit 1a'. The body 1a of the flow regulating unit 1a' is arranged with a spring element 5a to regulate the opening 4a in response to the pressure difference over the flow regulating unit 1a'. The spring element 5a is set to resist compression in accordance with the pressure difference occurring during normal fluid flow through the opening 4a.

As the skilled person will realize, a preloading arrangement capable of providing resistance until a certain pressure level is obtained and thereafter yielding in order to move the body 1a of the flow regulating unit 1a' away from its initial position, may be used as an alternative to the spring element 5a.

Stop means 6a is provided to ensure that the opening 4a of the flow regulating unit 1a' is set as a minimum opening as shown in FIG. 1 so that a continuous flow of fluid is ensured through the flow regulating unit 1a'. The stop means 6a may be provided as adjustable means, such as a screw as shown, or the stop means may be nonadjustable. Alternatively, if a non pre-compressed spring is used, its free length can be used to set the minimum opening between the body 1a of the flow regulating unit 1a' and the inner wall when the spring element 5a is in its neutral unloaded mode. A non pre-compressed spring will have to be relatively stiff in order to obtain a low flow if the flow regulating unit is exposed to a high pressure drop.

The size of the opening, such as the minimum opening 4a, may be adjusted to regulate the fluid flow passing through the opening, but regulating the flow does not affect the inlet pressure P1 and the outlet pressure P2 (and consequently does not affect the pressure difference over the flow regulating unit). The inlet and the outlet are large sized areas, and thus the comparatively small sized variations of flow from the inlet 2 to the outlet 3 do not influence the pressures of the large sized inlet area and the large sized outlet area. Thus the inlet pressure P1 and the outlet pressure P2 are constant independent of the flow through the opening 4a.

If debris gets stuck in the opening 4a and clogs the opening of flow regulating unit 1a', the debris will restrict the flow or in the worst case block the flow through the opening 4a completely. Due to the large size area of the inlet and outlet, the prevention of fluid flow through the opening 4a does not affect the inlet pressure and outlet pressure, which will be constant. Thus, the pressure difference/pressure drop over the flow regulating unit 1a' remains unmodified when the opening of the flow regulating unit is clogged. To be able to move the body 1a of the flow regulating unit 1a' in order to increase the opening 4a and release the debris, the resistant force provided by the spring element 5a needs to be exceeded. As the pressure difference/pressure drop remains unmodified when the opening of flow regulating unit is clogged, additional equipment such as a prior art control system discussed above, or other means, needs to be provided in order to unclog the opening of the flow regulating unit 1a'.

Figure 2A:
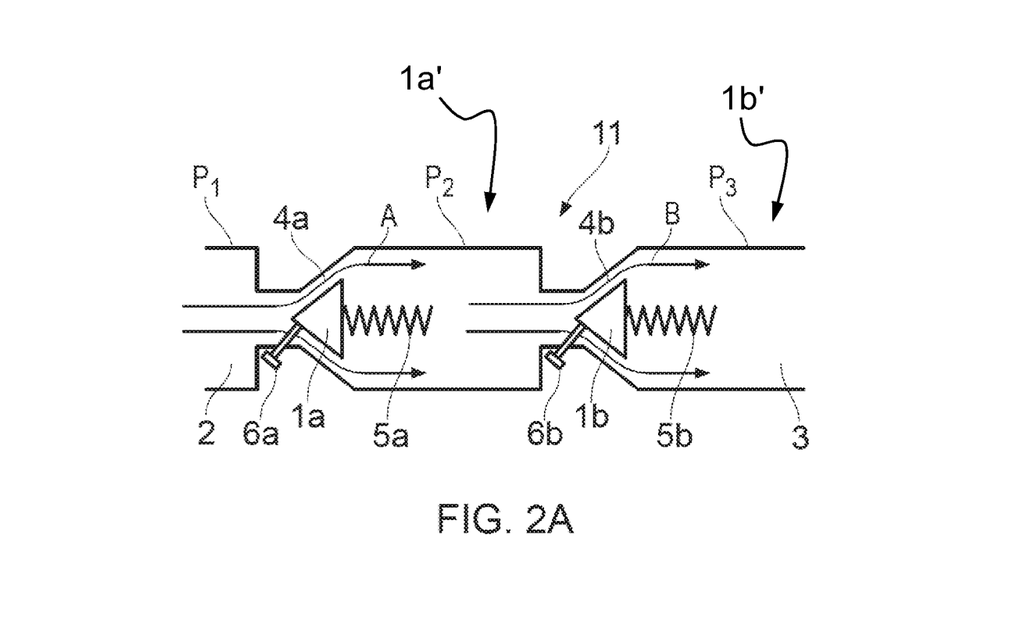
FIGS. 2A and 2B show two examples of the principle workings of the present invention.

Referring to FIG. 2A, in accordance with the invention a valve assembly 11 is provided which comprises at least two flow regulating units 1a', 1b' arranged in series between an inlet 2 and an outlet 3 of the valve assembly. The fluid flow enters the valve assembly through the inlet 2 and passes through respective openings 4a, 4b defined by respective bodies 1a, 1b of the flow regulating units. Each of the openings is maintained at a minimum opening by corresponding stop means 6a, 6b, which in FIG. 2 are shown as adjustable means such as screws. The fluid flow leaves the valve assembly 11 through the outlet 3. Similar to the flow regulating unit 1a described above, each of the flow regulating units 1a', 1b' also has a corresponding spring element 5a, 5b for each body 1a, 1b.

Arranging the flow regulating units 1a', 1b' one after the other in series provides a stepwise pressure reduction, where an intermediate pressure P2 has a value between the inlet pressure P1 (pump pressure) and the outlet pressure P3 (well pressure). In one application of the invention the pressure P1 may be 150 bar, P2 may be 100 bar and P3 may be 50 bar.

If debris becomes stuck in the opening 4a of the flow regulating unit 1a' and fluid communication is still possible through the opening 4b of the flow regulating unit 1b', the fluid flow through the opening 4b in the minimum opening position in the direction indicated by arrow B will decrease due to the interruption of fluid flow through the opening 4a in the minimum opening position. A small amount of debris may be trapped in the opening 4b, but fluid communication may still be possible through the opening 4b. As the flow through opening 4b decreases, the pressure difference/pressure drop over the flow regulating unit 1b' decreases. In some cases the flow B comes to full stop. The pressure equalizes over flow regulating unit 1b' since fluid communication is still possible through the opening 4b, and the pressure difference/pressure drop over the flow regulating unit 1b' will then approach 0 bar. The intermediate pressure P2 will then correspond to the outlet pressure P3, and as a result an increased pressure difference will exist over flow regulating unit 1a'.

The increased pressure difference over flow regulating unit 1a' with the clogged opening 4a provides the body 1a of the flow regulating unit 1a' with an opening force which exceeds the spring force of the spring 5a. As a result, the body 1a of the flow regulating unit 1a' is caused to move, thereby increasing the opening 4a in order to release the debris from its stuck position in the opening 4a.

In the above mentioned case where P1 is 150 bar, P2 is 100 bar and P3 is 50 bar, the equalization of pressure results in the flow regulating unit 1a' having a pressure of 150 bar at its inlet and only 50 bar at its outlet. Thus, the forces resulting from the increased pressure difference of the flow regulating unit 1a' working on the spring element 5a will be twice as high as under normal flowing conditions and will exceed the spring force and move the body 1a of the flow regulating unit 1a' to flush the opening 4a.

In the example shown in FIG. 2A, two flow regulating units 1a', 1b' are included in the valve assembly 11. However, by increasing the number of flow regulating units the pressure difference over each flow regulating unit will be lower during normal flow condition, and this allows for a larger change in pressure difference to occur over the flow regulating unit with the clogged opening, as the pressure available for equalization through the non-clogged minimum openings of the flow regulating units is the same. The increase of the number of the flow regulating units thereby provides a larger opening force on the flow regulating unit with the clogged opening, an increased opening for flushing of the debris, and a reduced risk that possible friction forces in the spring mechanism will not be overcome when the pressure difference increases.

Figure 2B:
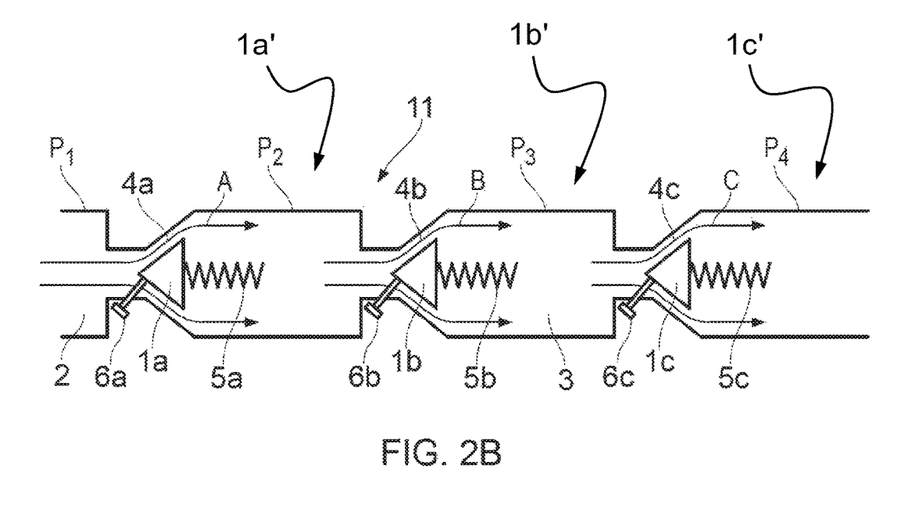

In the example shown in FIG. 2B, three flow regulating units 1a', 1b', 1c' are included in the valve assembly 11. Further embodiments of the valve assembly may include four or five flow regulating units, and in some circumstances more than five flow regulating units. In FIG. 2B the additional third flow regulating unit 1c' has the same configuration as flow regulating units 1a', 1b' and is provided with a spring 5c and stop means 6c to ensure opening 4c has a minimum opening position. Given that the inlet pressure P1 is 150 bar and the outlet pressure P4 is 50 bar, the intermediate pressure P2 may for instance be between 100-125 bar and the intermediate pressure P3 may for instance be between 75-100 bar, thus providing a stepwise reduction of pressure between the inlet and outlet under normal flowing conditions. The stepwise reduction of pressure between the inlet and outlet may occur in uniform or non-uniform steps. Increasing the number of flow regulating units causes an increase of the ratio between the pressure difference working on the regulating unit with clogged opening and the pressure difference during normal flow. This increased ratio is advantageous to ensuring that possible friction in the spring is overcome and the spring force is exceeded, thereby increasing the opening for flushing.

In addition, increasing the number of flow regulating units provides the advantageous effect of reducing the probability of all the flow regulating unit openings being clogged at the same time. Since a condition for obtaining flushing is that fluid communication is maintained over at least one of the flow regulating units, increasing the number of flow regulating units in the valve arrangement is a preventive measure to secure the proper working of the invention.

A prerequisite for the valve assembly 11 to obtain the self cleaning feature is that the pressure that is equalized over the flow regulating unit(s) with non-clogged openings must be able to move around in the valve assembly 11 and concentrate over flow regulating unit(s) with the clogged opening. The proper working of the valve arrangement 11 is ensured by the presence of the minimum opening of each of the flow regulating unit(s) of the valve assembly. In the case where the body of the flow regulating unit is arranged at a distanced from the seat in order to provide the minimum opening, stop means may be provided to prevent the body of the flow regulating unit from coming into contact with the seat and thereby form a seal. If sealing occurs, pressure can get trapped between flow regulating units with non-clogged openings and the pressure drop will be prevented from moving around in the valve assembly 11.

Figure 3:
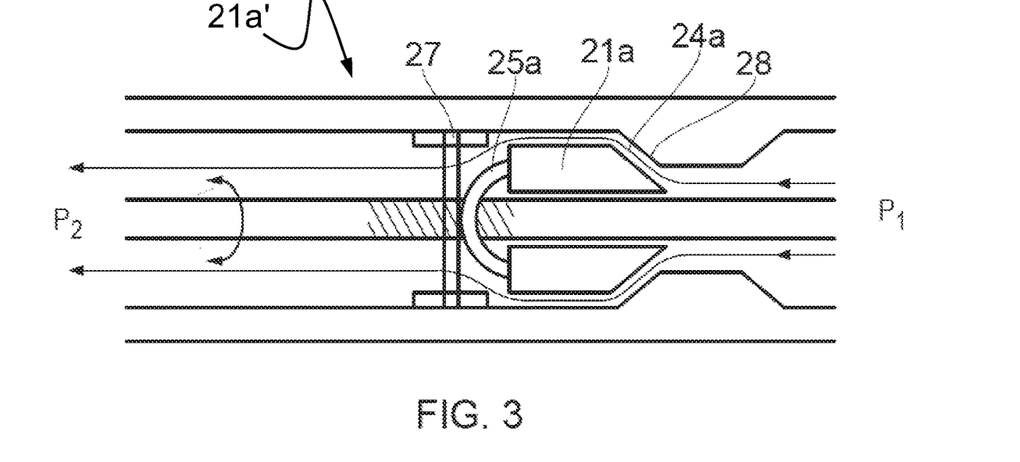
FIG. 3 shows an embodiment of the invention in which a stiff spring is included in the valve assembly.
Figure 4:
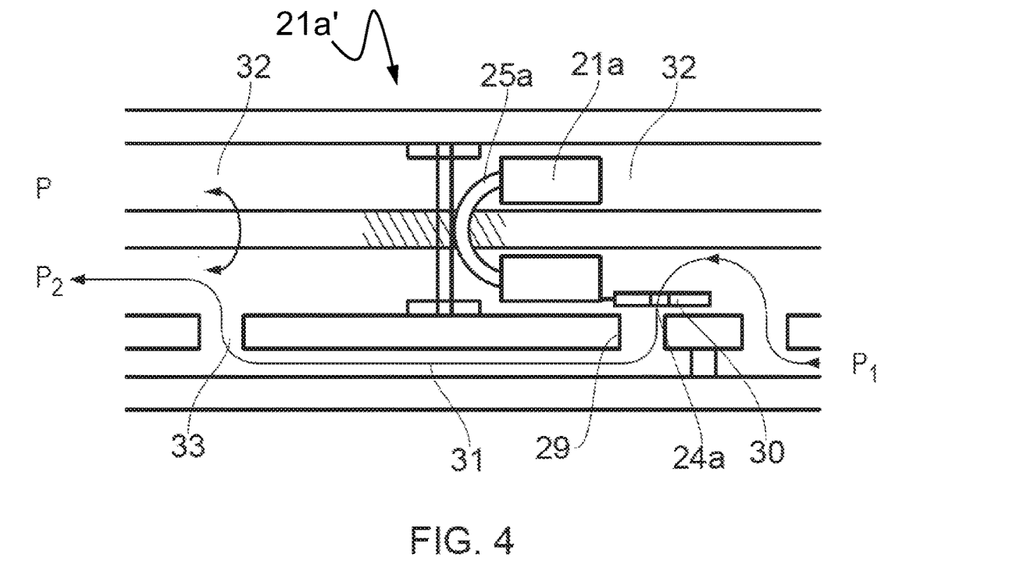
FIG. 4 shows another embodiment of the invention in which a non-pre compressed stiff spring is included in the valve assembly.

There are two principal ways of preventing the body of the flow regulating unit from coming into contact with the seat and sealing and still maintain the ability for the body of the flow regulating unit to move if the pressure drop increases. FIGS. 3 and 4 show examples of one of these principles, while FIGS. 5 and 6 show examples of the other of these principles.

FIG. 3 shows an example of a simple solution where the spring element 25a is a stiff spring that reaches its zero tension level before the body 21a of the flow regulating unit 21a' fully closes against a seat 28. A positioner device 27 is provided to position the body 21a of the flow regulating unit 21a' to provide an opening such as a minimum opening 24a between the body 21a of the flow regulating unit 21a' and the seat 28. The minimum opening 24a is ring shaped as shown in FIG. 3. The spring element 25a provided as a stiff spring could imply restrictions on the flow range because the minimum opening 24a under normal flowing conditions has to be larger than the corresponding displacement occurring during the deflection of the spring element 25a. If the size of the minimum opening 24a is set to less than the corresponding displacement occurring during the deflection of the spring element 25a, the minimum opening 24a will close fully when the spring element 25a approaches its neutral unloaded position (if the local pressure drop is lost due to a flow that approaches zero due to clogging in one of the other orifices). In this embodiment the body 21a of the regulating unit 21a' is not resting against stop means as shown in FIGS. 2A and 2B. The body of the regulating unit rests on the forces from the pressure difference and flow dynamics created by the flow passing through the regulating unit. This will most likely lead to small frequent changes in its position (vibrations). This will make it difficult for debris to build up.

FIG. 4 shows an alternative embodiment to the solution of FIG. 3 for providing an opening such as a minimum opening by a flow orifice. In FIG. 4 the flow orifice is provided by two overlapping holes 29, 30 that define a flow passage to direct the fluid flow away from the main bore 32 and into a channel 31 arranged in parallel with the main bore 32. The channel 31 is arranged with a hole 33 that returns the fluid flow to the main bore 32 at the other side of the body 21a of the flow regulating unit 21a'.

Figure 5:
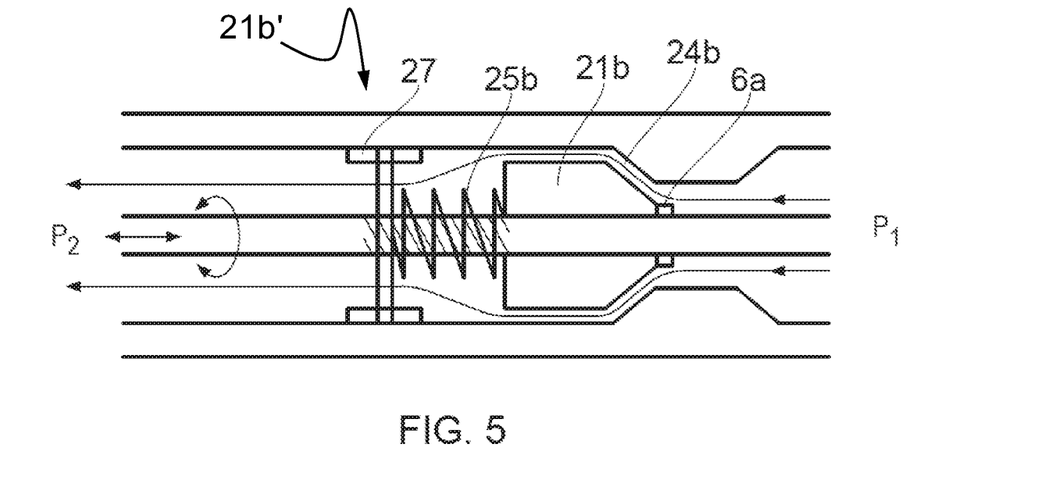
FIG. 5 shows an embodiment of the invention in which a pre-compressed relatively softer spring is included in the valve assembly.
Figure 6:
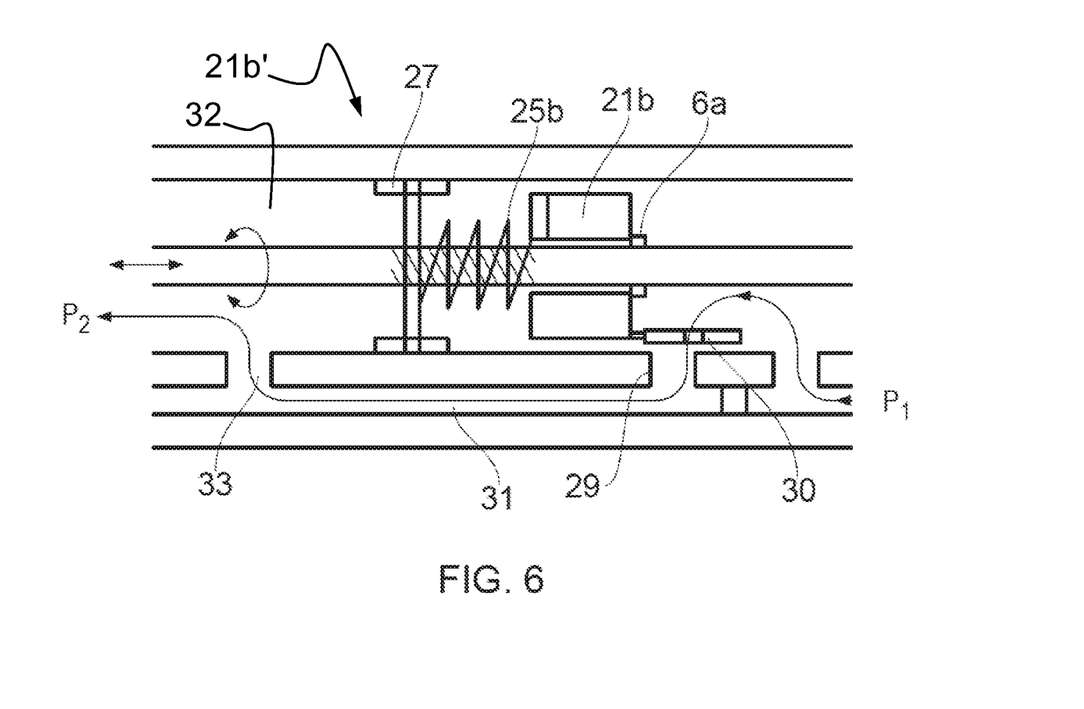
FIG. 6 shows another embodiment of the invention in which a pre-compressed relatively soft spring is included in the valve assembly.

FIG. 5 shows the spring element 25b as a pre compressed spring that pushes the body 21b flow regulating unit 21b' against stop means 6a, such as for instance the end of a screw. The positioner device 27 may be configured to act as an end stop for the spring element 25b and may in addition be used as means to compress the spring element 25b by displacing the positioner device 27 between various positions. The stop means 6a determines the minimum opening 24b during normal flowing conditions and the minimum opening allows the differential pressure to concentrate and move to the regulating unit with the clogged opening when clogging occurs.

FIG. 6 shows an alternative embodiment to the solution of FIG. 5 for providing the flow orifice. The arrangement in FIG. 6 is similar to the one in FIG. 4, except that the spring element 25b is a pre-compressed spring, while the spring element in FIG. 4 is a stiff spring. As in FIG. 4, the flow orifice in the embodiment in FIG. 6 is provided by two overlapping holes 29, 30 that define a flow passage to direct the fluid flow away from the main bore 32 and into a channel 31 arranged in parallel with the main bore 32. The channel 31 is arranged with a hole 33 that returns the fluid flow to the main bore 32 at the other side of the body of the flow regulating unit 21a.

Figure 7:
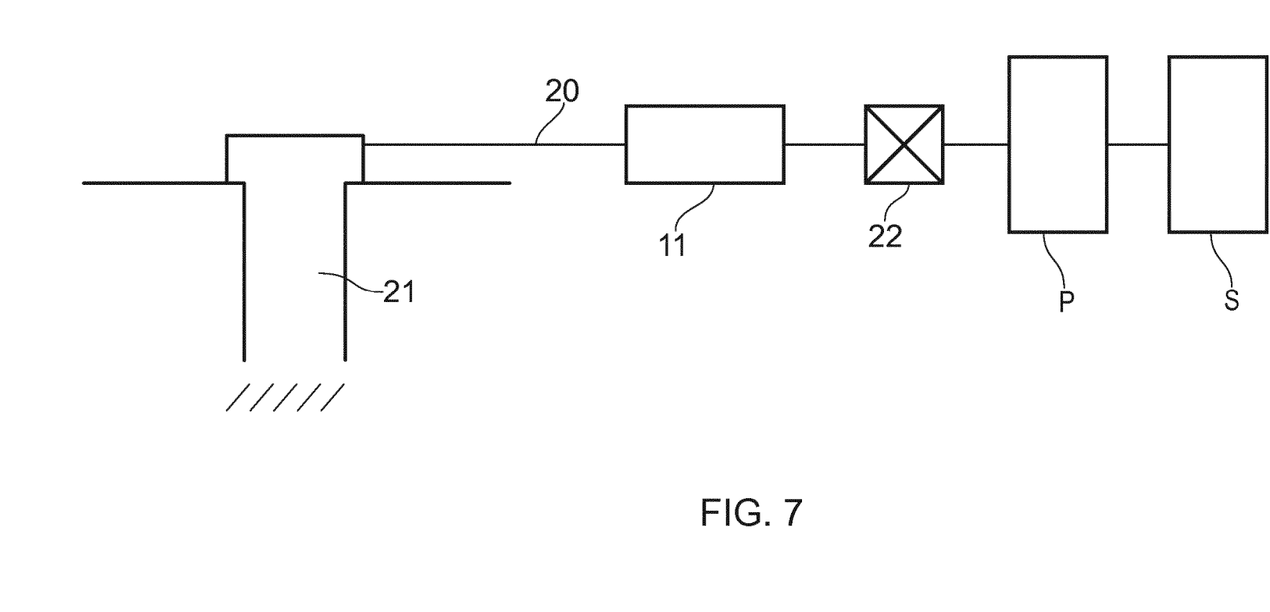
FIG. 7 shows a schematic illustration of the valve assembly included in a chemical fluid line.

FIG. 7 shows the valve assembly 11, for instance as shown in FIG. 2A or FIG. 3, implemented in a chemical injection line 20 connected to a well area 21. A pump unit P supplies chemical fluid from a source S through the injection line 20 into the well area 21. The chemical injection line 20 has a valve unit 22 for opening and closing well access through the chemical injection line 20. When the valve unit 22 is open the pump unit P may pump chemical fluid from the fluid source S into the well area through the valve arrangement 11. The spring elements of the flow regulating units in valve assembly 11 may be configured to be adjustable for controlling the openings for the flow regulating units and thereby the amount of injection fluid that enters the well.

In the preceding description, various aspects of the apparatus according to the invention have been described with reference to the illustrative embodiments. For purposes of explanation, specific numbers, systems and configurations were set forth in order to provide a thorough understanding of the apparatus and its workings. However, this description is not intended to be construed in a limiting sense. Various modifications and variations of the illustrative embodiments, as well as other embodiments of the apparatus, which are apparent to persons skilled in the art to which the disclosed subject matter pertains, are deemed to lie within the scope of the present invention.

The invention claimed is:

1. A method for flushing debris from a valve assembly arranged in a fluid line, the valve assembly comprising a plurality of flow regulating units arranged in series between an inlet and an outlet of the valve assembly, the inlet comprising an inlet pressure and the outlet comprising an outlet pressure, the inlet pressure being larger than the outlet pressure and defining a total pressure difference over the valve assembly, and each flow regulating unit having a spring element and an opening which initially is set at a minimum opening to allow fluid to pass from one side of the flow regulating unit to the other side of the flow regulating unit, wherein the spring element is configured to regulate a size of the opening in response to a corresponding pressure difference over the flow regulating unit, said corresponding pressure difference being a fraction of the total pressure difference, and the spring element comprising a spring force providing a desired opening in response to said corresponding pressure difference, the method comprising:
    in the event the opening of one of said flow regulating units becomes clogged with debris, equalizing the pressure over the other, unclogged flow regulating units to thereby create an increased pressure difference across the clogged flow regulating unit;
    wherein the increased pressure difference is greater than said corresponding pressure difference and generates a force on the clogged flow regulating unit which exceeds the spring force of the spring of the clogged flow regulating unit and increases the opening of the clogged flow regulating unit; and
    flushing the debris from the opening of the clogged flow regulating unit.

2. The method in accordance with claim 1, further comprising arranging at least one of the flow regulating units at a distance from a seat for the flow regulating unit to provide the minimum opening.

3. The method in accordance with claim 1, further comprising establishing the minimum opening of at least one of said flow regulating units by providing a recess in the flow regulation unit or in a seat for the flow regulation unit.

4. The method in accordance with claim 1, further comprising regulating the minimum opening of at least one of said flow regulating units by using an adjustable screw mechanism.

5. The method in accordance with claim 1, wherein the step of regulating the minimum opening is performed by the spring element.

6. The method in accordance with claim 1, wherein the step of flushing of debris from the valve assembly is performed by injecting a chemical fluid into a well area using the fluid line.

7. The method in accordance with claim 1, wherein when clogging of the opening of one flow regulating unit occurs, unclogged flow regulating units have minimum openings and the pressure over these unclogged flow regulating units therefore equalized.

8. The method in accordance with claim 1, wherein each flow regulating unit comprises a body which is biased by said spring element towards said position in which the flow regulating unit displays said minimum opening.

9. A valve assembly arranged in a fluid line comprising:
    a plurality of flow regulating units arranged in series between an inlet and an outlet of the valve assembly, the inlet comprising an inlet pressure and the outlet comprising an outlet pressure, the inlet pressure being larger than the outlet pressure and defining a total pressure difference over the valve assembly, and each flow regulating unit comprising a spring element and an opening which is initially set as a minimum opening to enable fluid to pass from one side of the flow regulating unit to the other side of the flow regulating unit, wherein the spring element is configured to regulate an opening for the flow regulating unit in response to a corresponding pressure difference over the flow regulating unit, said corresponding pressure difference being a fraction of the total pressure difference, and the spring element comprising a spring force providing a desired opening in response to said corresponding pressure difference;
    wherein if the opening of one of said flow regulating units becomes clogged with debris, said minimum openings of the other, unclogged flow regulating units provide for equalization of the pressure over the clogged flow regulating units and thereby results in an increased pressure difference over the clogged flow regulating unit, which increased pressure difference is greater than said corresponding pressure difference and generates a force on the clogged flow regulating unit which exceeds the spring force of the spring of the clogged flow regulating unit and increases a size of the opening to thereby enable the debris to be flushed from the opening.

10. The valve assembly in accordance with claim 9, wherein at least one of the flow regulating units is positioned at a distance from a seat of the flow regulating element to provide the minimum opening.

11. The valve assembly in accordance with claim 9, further comprising stop means which is configured to position at least one of the flow regulating units to provide the minimum opening.

12. The valve assembly in accordance with claim 11, wherein the stop means comprises an adjustable screw mechanism for regulation of the minimum opening.

13. The valve assembly in accordance with claim 9, wherein a recess in at least one of the flow regulating units or in a seat for the flow regulation unit provides the minimum opening.

14. The valve assembly in accordance with claim 9, wherein the spring element is configured to position at least one of the flow regulating units to establishing the minimum opening.

15. The valve assembly in accordance with claim 9, wherein the minimum opening diverts the fluid flow from the first side of the flow regulating unit through a fluid passage separated from the flow regulating unit and returns the fluid flow at the other side of the flow regulating unit.

16. Use of the valve assembly in accordance with claim 9 in a chemical injection fluid line.

17. A fluid injection valve assembly for regulation of fluid infected into a well, the fluid injection valve assembly being arranged in a fluid line and comprising a valve assembly in accordance claim 9 and a valve unit for opening and closing well access through the fluid line.

18. The injection valve assembly in accordance with claim 17, wherein the spring element of each flow regulating unit is configured to be adjustable for controlling the opening for the flow regulating unit to thereby control the amount of injection fluid to enter the well.

19. The valve assembly in accordance with claim 9, wherein each flow regulating unit comprises a body which is biased by said spring element towards said position in which the flow regulating unit displays said minimum opening.

* * * * *